(12) United States Patent
Bruno

(10) Patent No.: US 6,474,366 B2
(45) Date of Patent: Nov. 5, 2002

(54) FLEXIBLE PIPE FOR HIGH PRESSURE

(75) Inventor: Annibale Bruno, Bresso (IT)

(73) Assignee: Cidat S.p.A., Milan (IT)

( * ) Notice: Subject to any disclaimer, the term of this patent is extended or adjusted under 35 U.S.C. 154(b) by 0 days.

(21) Appl. No.: 09/907,876

(22) Filed: Jul. 17, 2001

(65) Prior Publication Data

US 2002/0014271 A1 Feb. 7, 2002

(30) Foreign Application Priority Data

Jul. 25, 2000 (IT) ..................................... MI2000A1700

(51) Int. Cl.[7] ................................................. F16L 11/08
(52) U.S. Cl. ....................... 138/134; 138/135; 138/133; 138/130
(58) Field of Search ................................. 138/135, 134, 138/133, 130, 132, 129, 144

(56) References Cited

U.S. PATENT DOCUMENTS

| | | | | | |
|---|---|---|---|---|---|
| 3,212,528 | A | * | 10/1965 | Haas ........................... | 138/129 |
| 3,729,028 | A | * | 4/1973 | Horvath et al. .............. | 138/130 |
| 5,269,349 | A | * | 12/1993 | Sugier et al. ................ | 138/129 |
| 6,053,213 | A | * | 4/2000 | Jung et al. .................. | 138/121 |
| 6,085,799 | A | * | 7/2000 | Kodaissi et al. ............ | 138/130 |
| 6,123,114 | A | * | 9/2000 | Seguin et al. ............... | 138/124 |

* cited by examiner

Primary Examiner—Patrick Brinson
(74) Attorney, Agent, or Firm—Hedman & Costigan, P.C.

(57) ABSTRACT

A flexible-pipe (10). for high pressure is provided with. a sublayer (11) made of natural or synthetic rubber or man-made polymers in general, and with a first and a second stiffening layer (12, 14), which are superimposed and both consist of a high-resistance metal spiral, whereby the spiral can have one or more wires. Between the first (12) and the second (14) layer there is interposed a skim coat (13) made of natural or synthetic rubber or man-made polymers in general. The flexible pipe (10) for high pressure is also coated with a coating (15) made of natural or synthetic rubber or man-made polymers in general.

9 Claims, 1 Drawing Sheet

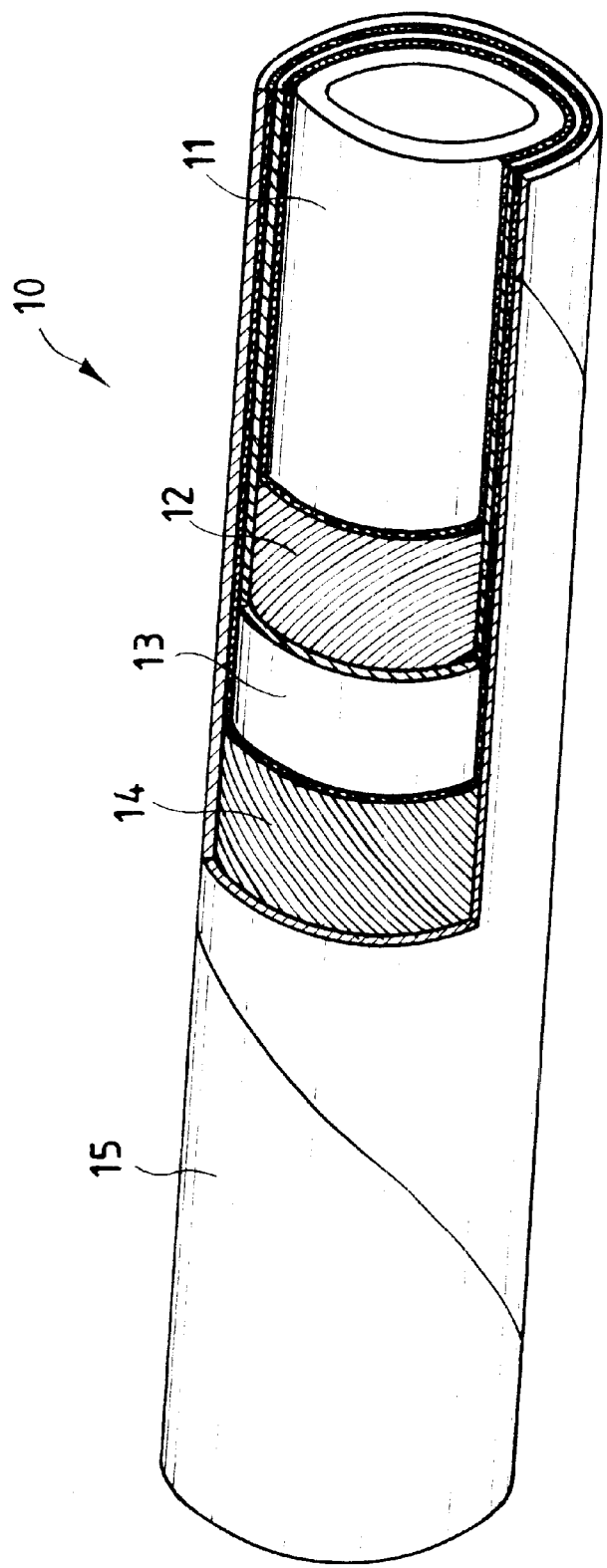

FLEXIBLE PIPE FOR HIGH PRESSURE

The present invention relates to a flexible pipe for high pressure.

Flexible pipes for high pressure are widespread, and they are used to transport oil or hot water or other fluids.

The present invention will make particular reference to applications of a flexible pipe for high pressure to oil transport for the hydraulic actuation of lift trucks, or to applications of a flexible pipe for transporting or conveying water in pressure in industrial water cleaning machines. In all cases, the pipe of the invention can be used for other uses besides those mentioned above.

In particular, for these purposes, pipes provided with a sublayer made of natural or synthetic rubber or man-made polymers in general are known, on which one or two stiffening plaits are applied to form as many superimposed layers.

Stiffening plaits are separated from each other by a skim coat made of natural or synthetic rubber or man-made polymers in general; moreover, such flexible pipes are coated with a coating made of natural or synthetic rubber or man-made polymers in general.

Plaited flexible pipes of the described type can be subject to various problems, among which an excessive thickness that causes undesired. dimensions, and. a bending radius that is not always satisfactory.

Thus, purpose of the present invention is that of realising a flexible pipe for high pressure that should maintain a high flexibility and lightness, degree, as well as minimum overall dimensions, even though being capable of standing high operating pressures.

Another purpose of the invention is that of realising a flexible pipe for high pressure that should be simple and inexpensive to realise.

These and other purposes are reached by a flexible pipe for high pressure according to claim 1, to which reference shall be made for shortness.

Further features of the invention are defined by the other claims attached to the present invention.

Further features and advantages of the present invention will appear more clearly from the following description and attached drawing, provided by way of an explicative and non-limiting example. In such drawing:

FIG. 1 shows an exploded axonometry view of a flexible pipe for high pressure, according to an embodiment of the present invention.

With particular reference to the mentioned figure, the flexible pipe for high pressure according to an embodiment of the present invention is globally indicated with reference-numeral 10.

The flexible pipe for high pressure 10 exhibits a sublayer 11 made of natural or synthetic rubber or man-made polymers in general, a first layer 12 consisting of a high-resistance steel spiral, and a second layer 14, also realised with a high-resistance steel spiral. In particular, spirals can have one or more wires. The spirals of the first and of the second layers have an opposite direction.

The first layer 12 and the second layer 14 are superimposed, and a skim coat 13 is arranged between them, preferably made of natural or synthetic rubber or man-made polymers in general.

Moreover, the flexible pipe for high pressure 10 is coated with a coating 15, also preferably made of natural or synthetic rubber or man-made polymers in general.

It must be noted that the flexible pipe 10 is particularly adapted to allow the transport of oil or water in pressure, or of other fluids in general.

In particular, the flexible pipe 10 can be advantageously used for transporting oil for the hydraulic actuation of lift trucks, or for transporting or conveying water in pressure in industrial water cleaning machines.

With the flexible pipe 10 according to the present invention it is possible to reach bursting pressures of over 1200 bars.

The bending radius obtained with the flexible pipe 10 according to the present invention is less than that of plaited pipes having the same diameter. The features of the flexible pipe for high pressure object of the present invention, as well as its advantages, clearly appear from the above description.

The following conclusive remarks and comments are intended to better and more clearly define the above advantages.

In the first place, the flexible pipe for high pressure according to the present invention is more flexible with respect to traditional plaited pipes.

Moreover, the pipe of the invention has better performances with respect to two-plait pipes since it is lighter and more flexible, in particular with reference to its resistance to pressure.

Moreover, it is less expensive, in particular due to the fact that through the use of spiralling machines, a higher productivity is obtained since the spiralling operation is faster than the plaiting operation.

Finally, it is clear that several variants can be made to the flexible pipes for high pressure, object of the present invention, without departing from the novelty principles of the inventive idea.

In the practical embodiment of the invention, the materials, shapes and sizes of the illustrated details can be of any type according to the requirements, and the same may be replaced with other technically equivalent details.

The scope of the invention is defined in the claims attached to the present application.

What is claimed is:

1. A flexible pipe for high pressure, of the type provided with a sublayer which defines a passage section for a fluid under pressure, and with a first and a second stiffening layer, characterized in that said first and second stiffening layers consist of a single-layer high-resistance metal spiral which have opposite directions and are separated by a skim coat of natural or synthetic rubber or man-made polymers.

2. Flexible pipe (10) according to claim 1, characterised in that between the first (12; and the second (14) stiffening layer there is interposed a skim coat (13) made of natural or synthetic rubber or man-made polymers in general.

3. The flexible pipe according to claim 1, characterized in that it is coated on the outer surface with a coating made of natural or synthetic rubber or man-made polymers.

4. The flexible pipe according to claim 1, characterized in that said spiral relating to said first and said second stiffening layers is made of high-resistance steel.

5. The flexible pipe according to claim 1, characterized in that said sublayer made of natural or synthetic rubber or man-made polymers.

6. The flexible pipe according to claim 1, characterized in that said fluid under pressure is oil or water.

7. The flexible pipe according to claim 6, characterized in that said pressure can reach bursting pressures over 1200 bars.

8. The flexible pipe according to claim 1, characterized in that it is used for transporting oil for the hydraulic actuation of lift trucks, or for transporting or conveying water in pressure, in industrial water cleaning machines.

9. A flexible pipe for high pressure which consists essentially of a sublayer which defines a passage section for a fluid in pressure, a first and a second stiffening layer, wherein said first and second stiffening layers consist of a single-layer high-resistance metal spiral which have opposite directions and are separated by a skim coat.

* * * * *